United States Patent
Blunier

(10) Patent No.: US 9,161,488 B2
(45) Date of Patent: Oct. 20, 2015

(54) WING LIFTING SYSTEM FOR AN AGRICULTURAL IMPLEMENT

(75) Inventor: Timothy R. Blunier, Danvers, IL (US)

(73) Assignee: CNH Industrial America LLC, New Holland, PA (US)

( * ) Notice: Subject to any disclaimer, the term of this patent is extended or adjusted under 35 U.S.C. 154(b) by 43 days.

(21) Appl. No.: 13/604,859

(22) Filed: Sep. 6, 2012

(65) Prior Publication Data

US 2014/0060861 A1   Mar. 6, 2014

(51) Int. Cl.
*A01B 73/04* (2006.01)

(52) U.S. Cl.
CPC .................................. *A01B 73/046* (2013.01)

(58) Field of Classification Search
USPC ............. 172/311, 452, 456, 464, 4, 239, 487; 111/53, 55, 57, 59, 60, 61
See application file for complete search history.

(56) References Cited

U.S. PATENT DOCUMENTS

| | | | |
|---|---|---|---|
| 3,425,628 A | 2/1969 | Reams | |
| 3,967,684 A | 7/1976 | Haverdink | |
| 4,178,009 A | 12/1979 | Worick | |
| 4,867,245 A * | 9/1989 | Stevens | 172/311 |
| 5,178,328 A * | 1/1993 | Broyhill | 239/168 |
| 5,427,182 A * | 6/1995 | Winter | 172/2 |
| 5,944,116 A | 8/1999 | Domries | |
| 6,089,329 A * | 7/2000 | Smith | 172/452 |
| 6,220,366 B1 * | 4/2001 | Noonan et al. | 172/311 |
| 6,318,477 B1 | 11/2001 | Bettin | |
| 6,367,562 B1 | 4/2002 | Mosdal | |
| 6,675,907 B2 * | 1/2004 | Moser et al. | 172/311 |
| 6,698,523 B2 * | 3/2004 | Barber | 172/4 |
| 7,073,604 B1 * | 7/2006 | Dobson et al. | 172/311 |
| 7,438,137 B2 | 10/2008 | Pederson et al. | |
| 7,497,269 B2 * | 3/2009 | Jagow | 172/311 |
| 7,549,482 B2 | 6/2009 | Wake et al. | |
| 7,918,285 B1 * | 4/2011 | Graham et al. | 172/2 |
| 2001/0045294 A1 * | 11/2001 | Mayerle et al. | 172/452 |

* cited by examiner

*Primary Examiner* — Matthew D Troutman
(74) *Attorney, Agent, or Firm* — Rebecca L. Henkel

(57) ABSTRACT

An agricultural implement is presented that includes a main tool bar supporting main agricultural tools. The agricultural implement also includes an inner wing tool bar pivotally coupled to the main tool bar and supporting inner wing agricultural tools. Moreover, the agricultural implement includes an outer wing tool bar pivotally coupled to the outer wing tool bar and supporting outer wing agricultural tools. Furthermore, the agricultural implement includes a folding system configured to rotate that outer wing tool bar relative to the inner wing tool bar to enable the agricultural implement to be operated in a narrower configuration.

18 Claims, 3 Drawing Sheets

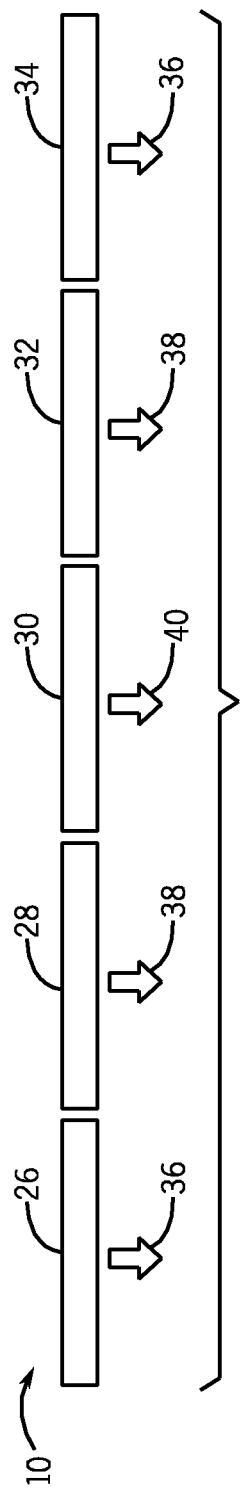
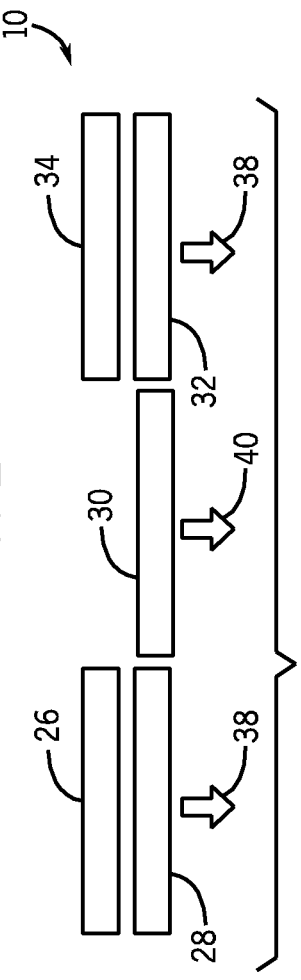
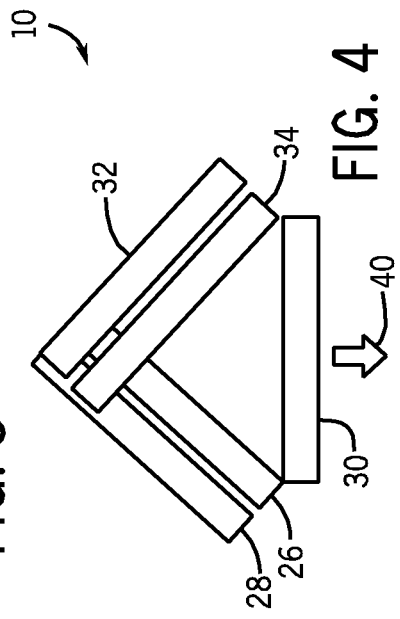
FIG. 2
FIG. 3
FIG. 4

WING LIFTING SYSTEM FOR AN AGRICULTURAL IMPLEMENT

BACKGROUND

The invention relates generally to ground working equipment, such as agricultural equipment, and more specifically, to an agricultural implement having foldable wings.

Generally, fertilizer application implements are towed behind a tractor or other work vehicle via a hitch assembly secured to a rigid frame of the implement. These fertilizer application implements typically include one or more ground engaging tools or openers that form a path for fertilizer deposition into the soil. The openers are used to break the soil, thereby enabling injection nozzles or knife (e.g., positioned behind the openers) to deposit fertilizer at a desired depth beneath the soil surface. Using such an implement, fertilizer may be distributed throughout a field, either before or after planting, to facilitate enhanced crop development.

BRIEF DESCRIPTION

In one embodiment, an agricultural implement includes a main tool bar supporting main agricultural tools. The agricultural implement also includes an inner wing tool bar pivotally coupled to the main tool bar and supporting inner wing agricultural tools. Moreover, the agricultural implement includes an outer wing tool bar pivotally coupled to the outer wing tool bar and supporting outer wing agricultural tools. Furthermore, the agricultural implement includes a folding system configured to rotate that outer wing tool bar relative to the inner wing tool bar to enable the agricultural implement to be operated in a narrower configuration.

In another embodiment, an agricultural implement includes a main tool bar supporting main agricultural tools. The agricultural implement also includes an inner wing tool bar supporting inner wing agricultural tools, the inner wing tool bar being pivotally coupled to the main tool bar. Additionally, the agricultural implement includes an outer wing tool bar supporting outer wing agricultural tools, the outer wing tool bar being pivotally coupled to the inner wing tool bar. Furthermore, the agricultural implement includes a folding system configured to rotate the outer wing tool bar relative to the inner wing tool bar while maintaining a downward force on the main tool bar and the inner wing tool bar.

In a further embodiment, a method of operating an agricultural implement that includes raising outer wing tool bars of the agricultural implement to enable the agricultural implement to operate in a narrower configuration. The method also includes lowering inner wing tool bars and a main tool bar. Furthermore, the method includes applying a downward force on the inner wing and main tool bars to urge agricultural tools to engage soil.

DRAWINGS

These and other features, aspects, and advantages of the present invention will become better understood when the following detailed description is read with reference to the accompanying drawings in which like characters represent like parts throughout the drawings, wherein:

FIG. 2 is a block diagram of the embodiment of the agricultural implement of FIG. 1 having inner and outer wings deployed in an unfolded or down position;

FIG. 3 is a block diagram of the embodiment of the agricultural implement of FIG. 1 having outer wings deployed in an up or folded position and inner wings in an unfolded or down position;

FIG. 4 is a block diagram of the embodiment of the agricultural implement of FIG. 1 having both inner and outer wings deployed in an up or folded position.

DETAILED DESCRIPTION

Figure 1:
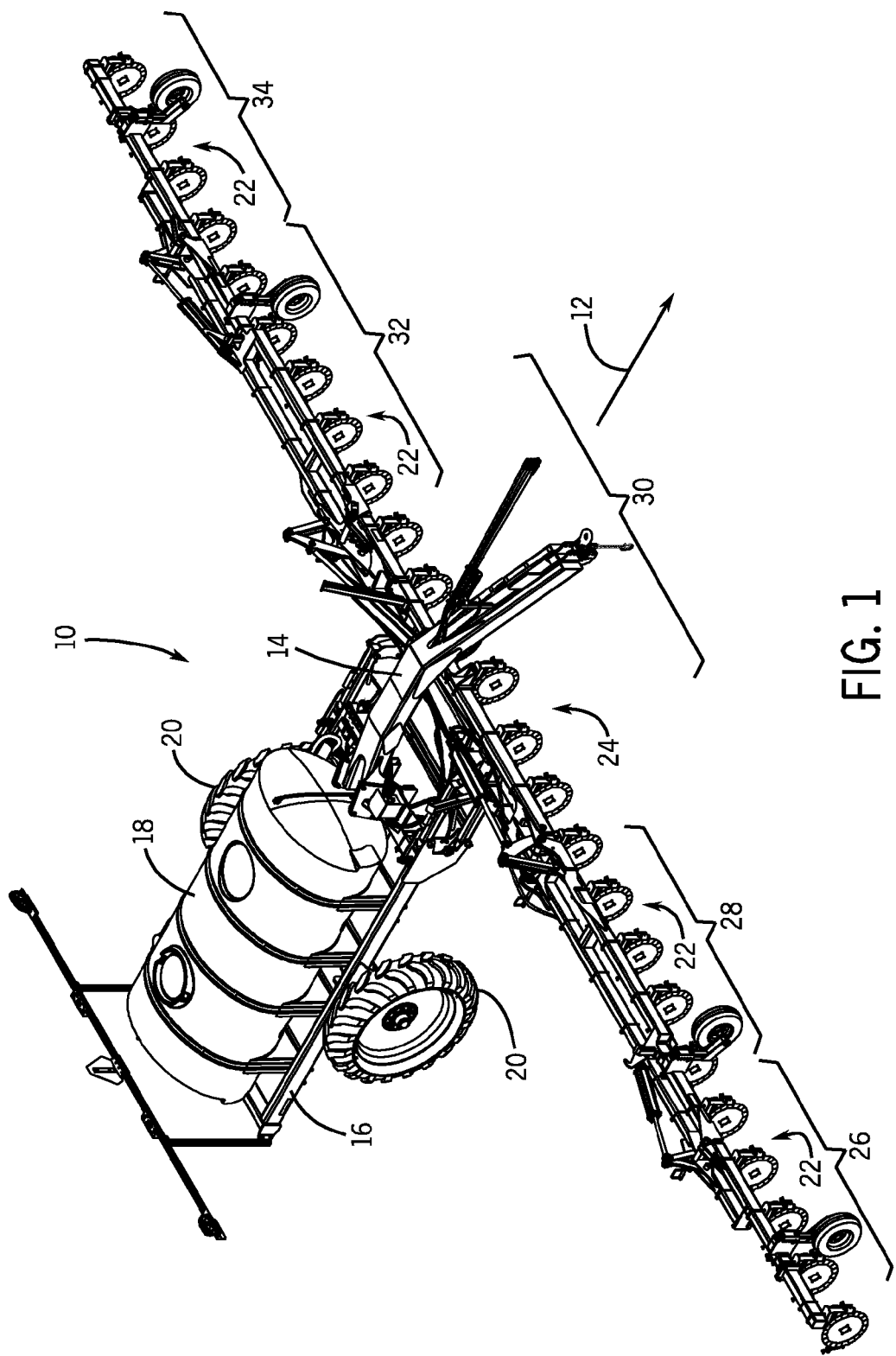
FIG. 1 is a perspective view of an embodiment of an agricultural implement having a storage tank mounted between frame rails.

FIG. 1 is a perspective view of an embodiment of an agricultural implement 10 having a storage tank mounted between frame rails. In the illustrated embodiment, the implement 10 is configured to be towed along a direction of travel 12 by a work vehicle, such as a tractor or other prime mover. The work vehicle may be coupled to the implement 10 by a hitch assembly 14, such as the illustrated "goose neck" frame. As illustrated, the hitch assembly 14 is coupled to a main frame 16 of the implement 10 to facilitate towing of the implement 10 in the direction of travel 12. In the illustrated embodiment, the main frame 16 supports a storage tank 18 configured to house a flowable agricultural product, such as fluid fertilizer (e.g., urea, anhydrous ammonia, etc.). A pair of wheels 20 coupled to the main frame 16 is configured to support the weight of the frame 16, the storage tank 18, and the flowable agricultural product, thereby enabling the implement 10 to be towed across the filed.

The implement 10 is configured to transfer the flowable agricultural product from the storage tank 18 to multiple row units 22 of a tool bar assembly 24. Each row unit 22 includes a ground engaging tool configured to break the soil, thereby excavating a trench into the soil. An injection nozzle (e.g., positioned behind the ground engaging tool) is configured to deposit flowable agricultural product from the storage tank 18 into the trench formed by the ground engaging tool. In certain embodiments, a penetration depth of the ground engaging tools is adjustable to facilitate deposition of the agricultural product at a desired depth beneath the soil surface. Accordingly, a flowable agricultural product, such as fluid fertilizer, may be distributed throughout a field, either before or after planting, to facilitate enhanced crop development.

While the illustrated implement 10 includes 24 row units 22, it should be appreciated that alternative implements may include more or fewer row units 22. For example, certain implements 10 include a tool bar assembly 24 having a right outer wing 26, a right inner wing 28, a central tool bar 30, a left inner wing 32, and a left outer wing 34. Additionally, certain implements may include 12, 16, 20, 24, 32, or more row units 22 distributed across the central tool bar 30 and wings 26, 28, 32, and 34. As discussed below in further detail, the number of row units and the spacing between row units may be particularly selected to correspond to the arrangement of row units on respective seeding or planting implements. For example, the implement 10 may include 24 row units 22 spaced 30 inches from one another. Accordingly, as the implement 10 is towed across a field, the row units 22 deposit fertilizer in rows having 30-inch spacing. After the fertilizer is applied, a seeding or planting implement having row units configured to deposit seeds into the soil at 30-inch spacing is aligned with the rows of fertilizer. As the seeding or planting implement moves across the field, seeds are placed into contact with the previously applied fertilizer, thereby facilitating enhanced crop development. In addition, the implement 10 may be utilized to apply fertilizer to previously planted seeds (e.g., via aligning the row units 22 with the rows of seeds).

As discussed in further detail below, the agricultural implement 10 has foldable wings (e.g., right outer wing 26) each having one or more row units attached. Additionally, the foldable wings may fold to allow the agricultural implement 10 to change the number of row units 22 that engage the ground during operation of the agricultural implement 10 on a field. By enabling the agricultural implement 10 to change the number of row units 22 engaging the field, the agricultural implement 10 may be efficiently operated in fields planted with row planters with various numbers of rows planted. For example, in certain embodiments, the agricultural implement 10 may be used in a field that has been planted with a planter having 16 rows when one or more are placed in a folded position, but the agricultural implement 10 may be suitably used in a field that has been planted with a planter having 24 rows when the wings are deployed in the unfolded position. In other embodiments, the agricultural implement 10 may engage 12, 16, 20, 32, or more row units 22 with the ground when all wings are deployed in the unfolded position, but may engage 4, 8, 12, 16, 24, 28, or more row units 22 with the ground when one or more wings are deployed in the folded position.

By enabling the agricultural implement to operation with variable widths, one model of the agricultural implement 10 may be used on to fertilize a variety of fields. Furthermore, by making one agricultural implement 10 capable of operating in various field types, a versatile embodiment of the agricultural implement 10 enables many users (e.g., an agricultural cooperative program) to purchase one agricultural implement 10 that may be shared between multiple field types within the group even if the fields have various sizes and/or are planted with various planter sizes/types.

FIG. 2 is a block diagram of the agricultural implement 10 having a right outer wing 26, a right inner wing 28, a central tool bar 30, a left inner wing 32, and a left outer wing 34. In the illustrated embodiment, each of the wings 26, 28, 32, and 34 are each deployed in an unfolded position. Additionally, the agricultural implement 10 may apply an outer wing downward force 36 that urges the right outer wing 26 and the left outer wing 34 towards the soil when the outer wings 26 and 34 are in the unfolded position. Specifically, the downward force 36 urges the row units 22 supported by the outer wings 26 and 34 into the soil at a constant depth when the outer wings 26 and 34 are in the unfolded position. The agricultural implement 10 also may apply an inner wing downward force 38 that urges the inner wings 28 and 32 towards the soil when the inner wings 28 and 32 are in the downward position. Similar to the outer wing downward force 36, the inner wing downward force may urges the row units 22 supported by the inner wings 28 and 32 into the soil at a constant depth during operation of the agricultural implement 10 when the inner wings 28, 30 are in the unfolded position. Furthermore, a central tool bar downward force 40 may be exerted on the central tool bar that urges the central tool bar 30 in a downward direction. Specifically, the central tool bar downward force 40 urges the central tool bar 30 in a downward direction such that row units 22 supported by the central tool bar 30 may engage the soil at a constant depth during operation of the agricultural implement 10 on a field.

In certain embodiments, the outer wing downward force 36, the inner wing downward force 38, and the central tool bar downward force 40 may each be relatively equal, resulting from similar pressures being applied to hydraulic actuators associated with these components. The forces and pressures may, in certain implementations, take into account factors such as the different weights of the components when in the unfolded and folded positions, and so forth. Some embodiments may include outer wing downward forces 36 and inner wing downward forces 38, and these too may be generally similar or equal to those of the other segments of the implement. However, other embodiments may include outer wing downward forces 36, inner wing downward forces 38, and central tool bar downward force 40 each of differing magnitudes with the central tool bar downward force 40 as the highest magnitude, the inner wing downward force 38 at a lower magnitude, and the outer wing downward force 36 at the lowest magnitude. In other words, such embodiments include downward forces of the bars and wings decrease as the distance from the center of the agricultural implement 10 increases. Moreover, as described below, the downward forces may result from automatic operation of control equipment, such as hydraulic circuits, without the need for operator intervention, although calibration, overriding or other intervention may be provided for.

In the various embodiments, the downward forces 36, 38, and 40 are configured to urge the central tool bar 26 and the wings 26, 28, 32, and 34 to maintain a constant height above the soil such that the row units 22 attached to the central tool bar 26 and/or the wings 26, 28, 32, and 34 maintain a substantially constant depth during operation of the agricultural implement 10 in a field. Additionally, the downward forces 36, 38, and 40 are each applied to a respective tool bar or wing such that each section of the agricultural implement may have a downward force applied separate from the other sections. As can be appreciated, by applying the downward forces separately to each section rather than applying the downward force to one portion that is mechanically distributed to the other portions, the agricultural implement 10 may maintain a substantially constant depth of agricultural tools attached to each section even when the agricultural implement is operated on uneven terrain. Furthermore, as discussed in further detail below, by having independently applied downward forces 36, 38, and 40, at least one of the downward forces may be applied even if one or more of the wings are deployed in the folded position.

As discussed in detail below, the agricultural implement 10 includes a system for rotating the outer wings 26 and 34 between folded and unfolded positions relative to the inner wings 28 and 32. FIG. 3 is a block diagram of the agricultural implement 10 of FIG. 2 illustrating the right outer wing 26 and the left outer wing 34 deployed in an folded position. As can be appreciated, by rotating the right outer wing 26 relative to the right inner wing 28 and rotating the left outer wing 34 relative to the left inner wing 32, the overall width of the agricultural implement 10 is reduced and thereby reducing the overall number of row units 22 that engage with the soil during operation of the agricultural implement 10 on a field. By including a folding/unfolding system, the agricultural implement 10 may be deployed with outer wings 26 and 34 deployed in unfolded positions as illustrated in FIG. 2 to apply fertilizer to as many rows as possible in a single pass, but the agricultural implement may be operated with the outer wings 26 and 34 in folded positions as illustrated in FIG. 3 in a narrower field and/or in a field planted with a narrower planter to cover less rows per pass of the agricultural implement 10. As previously discussed, the adjustable configurations enable the versatile use of the agricultural implement 10 to be efficiently used in fields of various sizes and/or patterns.

Furthermore, as discussed below, the agricultural implement 10 enables the application of an inner wing downward force 38 and the central tool bar downward force 40 regardless of whether the outer wings 26 and 34 are deployed in folded or unfolded positions. As discussed in greater detail below, even if the outer wing downward forces 36 are enabled when the outer wings 26 and 34 are in respective folded positions, the downward forces 36 may be selected to enable the outer wing downward force 36 to exert a pressure less than a threshold that rotates the outer wings 26 and 34 from respective folded positions into respective unfolded positions.

As discussed in detail below, the agricultural implement 10 includes a system for rotating the inner wings 28 and 32 between folded and unfolded positions relative to the central tool bar 30. FIG. 4 is a block diagram of the agricultural implement 10 illustrating the wings 26, 28, 32, and 34 in respective folded positions. In certain embodiments, the agricultural implement 10 may be operated in narrower deployment than when the inner wings 28 and 32 are in the unfolded position as illustrated in FIG. 3. When the agricultural implement 10 is operated with the inner wings 28 and 32 in respective unfolded positions, the central tool bar downward force 40 may be enabled to maintain a substantially constant height of the central tool bar 30 and to urge any row units 22 supported by the central tool bar 30 into the soil at a substantially constant depth. Furthermore, in certain embodiments of the agricultural implement 10, even if the outer wing downward force 36 and/or the inner wing downward force 38 are enabled with the inner wings 28 and 32 and/or the outer wings 26 and 34 in the folded positions, the downward forces 36 and 38 are less than the threshold of pressure used to rotate the respective wings into respective unfolded positions. In other words, in such embodiments, the downward forces may be selected such that the enablement of the downward forces 36 and 38 would not alone be sufficient to rotate the wings to unfolded positions from respective folded positions.

Additionally or alternatively, in certain embodiments, the inner wings 28 and 32 may be rotated into respective folded positions to place the agricultural implement 10 into a transport mode that eases travel (e.g., across roads). In such embodiments, the central tool bar downward force 40 (along with the other downward forces) may be disabled and/or reversed to raise the control tool bar 30 in respect to the soil to increase ground clearance such that the likelihood of contact with the earth during transport is reduced. In certain embodiments, the central tool bar 30 and/or wings may be raised before folding the wings to reduce the likelihood of contact between various portions of the agricultural implement 10.

Figure 5:
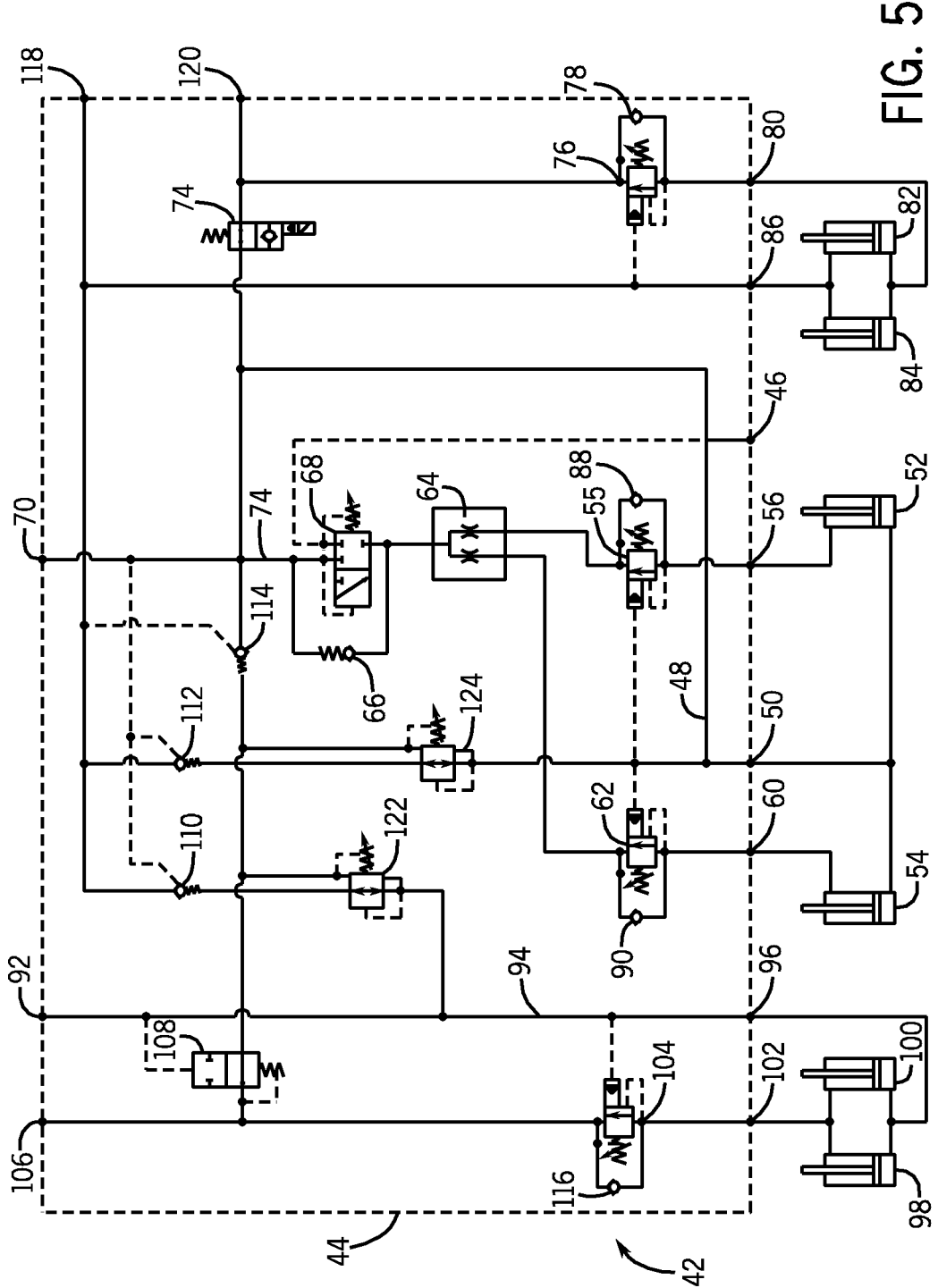
FIG. 5 is a schematic view of a hydraulic circuit configured to move the central tool bar and wings relative to each other.

FIG. 5 illustrates a hydraulic circuit 40 that may be included in the agricultural implement 10. In certain embodiments, the hydraulic circuit 42 may be based upon valving disposed in or on a manifold 44. The manifold 44 may couple to a tow vehicle (e.g., tractor) control mechanism that controls the functions of the hydraulic circuit 42 through connections with the manifold 44 through various connections to the ports. For example, a hydraulic line may lead from the tow vehicle to supply hydraulic fluid to the hydraulic circuit 42 through the unfolding port 46 to initiate an unfolding mode of the inner wings 28 and 32. In other embodiments, the agricultural implement 10 may be coupled to a hydraulic supply that is separate from a tow vehicle.

In certain embodiments, the hydraulic circuit 42 may rotate the inner wings 28 and 32 relative to the central tool bar 30 to respective unfolded positions by sending pressurized fluid from a hydraulic supply through the unfolding port 46. When the hydraulic fluid enters the unfolding port 46, the fluid flows through the hydraulic line 48 and out of the manifold 44 through the hydraulic port 50. The fluid then enters actuating cylinders 52 and 54. The actuating cylinders 52 and 54 actuate the rotation of the inner wings 28 and 32 relative to the central tool bar 30. As illustrated, each of the actuating cylinders is a double-acting cylinder that may be used to rotate the inner wings 28 and 32 in either direction to toggle the wings between folded and unfolded positions. As can be appreciated, when fluid enters the cylinders 52 and 54 through the hydraulic port 50, the cylinders 52 and 54 extend and urge the inner wings 28 and 32 toward an unfolded position as illustrated in FIGS. 1 and 2.

After the cylinders 52 and 54 have been extended, the fluid flows through the other end of the cylinders. Specifically, the fluid exiting the actuating cylinder 52 flows through into the manifold 44 through the hydraulic port 56 toward the counterbalance valve 58, and fluid exiting the actuating cylinder 54 flows into the manifold 44 through the hydraulic port 60 toward the counterbalance valve 62. In certain embodiments, the counterbalance valves 58 and 60 are typically closed until sufficient pressure builds up in the hydraulic line 48 to open the counterbalance valve 58 through a pilot connection. When pressurized fluid enters the unfolding port 46 sufficient to actuate the cylinders 52 and 54, the hydraulic line 48 may be sufficiently pressurized to open the counterbalance valves 58 and 62. Thus, the fluid may flow through each of the counterbalance valves 58 and 62 to the flow divider-combiner 64. The flow divider-combiner 64 combines the two flows and keeps the flow through the counterbalance valves 58 and 62 substantially the same, thereby keeping the cylinders 50 and 52 substantially evenly pressurized and the inner wings 28 and 32 remains substantially even with each other during rotation. By rotating the inner wings 28 and 32 substantially evenly, stress on the agricultural implement 10 may be minimized while the inner wings 28 and 32 are unfolding. Once the flows have been combined in the flow divider-combiner 64, the fluid passes through the check valve 66 and bypasses the pressure sequencing valve 68 to flow out of the folding port 70 back to the hydraulic supply. In other words, fluid sent through the unfolding port 46 may rotate the outer wings 26 and 34 rotated into the folded position illustrated in FIG. 2.

The hydraulic circuit 42 may also be used to fold the inner wings 28 and 32 from unfolded position to respective folded positions. To engage an inner wing fold, pressurized fluid may be sent through the folding port 70. In certain embodiments, it may be desirable to raise the central tool bar 30 prior to folding to reduce the probability of contact between the various portions of the agricultural implement. Accordingly, when fluid flows through the folding port 70, a portion of the fluid flows through the hydraulic line 72 toward the solenoid valve 74 to raise the central tool bar 30 for the folding of the inner wings 28 and 32. As discussed below, the solenoid valve 74 controls the flow of hydraulic fluid. When fluid flows through the solenoid valve 74 toward the counterbalance valve 76, the fluid bypasses the counterbalance valve 76 through the check valve 78. The fluid then exits the manifold 44 through the hydraulic port 80 to enter the actuating cylinders 82 and 84. Each of the cylinders 82 and 84 may be a double acting cylinder that enables the hydraulic circuit 42 to raise and lower the central tool bar 30 when pressurized fluid enters the folding port 70. As can be appreciated, the hydraulic circuit 42 may extend the cylinders and urge the central tool bar 30 away from the soil. After the fluid exits the actuating cylinders 82 and 84, the fluid re-enters the manifold 44 through hydraulic port 86 to return to the hydraulic supply.

When pressurized fluid enters the manifold 44 through the folding port 70, a second portion of the fluid flows toward the pressure sequencing valve 68 while a first portion flows through hydraulic line 72. However, the check valve 66 and pressure sequencing valve 68 initially keep the liquid from flowing to the flow divider-combiner 64. Once the pressure in the line 72 crosses a certain threshold used to raise the central tool bar 30 (e.g., 1,700 psi), the pressure sequencing valve 68 opens, thereby enabling the fluid to pass through the pressure sequencing valve 68 to the flow divider-combiner 64. In other words, the pressure sequencing valve 68 blocks the flow of the second portion of the fluid to fold the wings until the central tool bar 30 has been raised to reduce the likelihood of contact between the parts of the agricultural implement 10 making contact between various parts. Once the fluid enters into the flow divider-combiner 64, the flow divider-combiner 64 divides the fluid into two substantially equal flows each actuating a respective actuator cylinder 52 and 54 to fold the inner wings 28 and 32 substantially evenly. After the fluid flows from the flow divider-combiner 64 in two flows, each of the flows bypass a respective counterbalance valve 58 and 62 by flowing through a respective check valve 88 and 90 to exit the manifold 44 through respective hydraulic ports 56 and 60. After exiting the manifold 44, the flows enter the hydraulic cylinders 52 and 54 extending the cylinders and urging the inner wings 28 and 32 to rotate in relation to the central tool bar 30 toward an unfolded position. Once the fluid has actuated the cylinders 52 and 54, the fluid flows recombine and enter the manifold 44 through the hydraulic port 50 to flow back to the hydraulic supply through the unfolding port 46.

Additionally, the hydraulic circuit 42 may be used to unfold the outer wings 26 and 34. To unfold the outer wings 26 and 34, pressurized fluid is sent into the manifold 44 through the outer wing unfolding port 92. The fluid flows through the hydraulic line 94 out the manifold 44 through the hydraulic port 96. The fluid then flows into the actuator cylinders 98 and 100 thereby urging each cylinder to extend and rotate a respective outer wing 26 and 34 to an unfolded position. Moreover, the actuator cylinders 98 and 100 have some threshold pressure (e.g., 2,200 psi) at which point the wings begin to unfold. Once the threshold pressure is achieved, the outer wings 26 and 34 are to respective unfolded positions, and the fluid re-enters the manifold 44 through the hydraulic port 102 to pass through the counterbalance valve 104. Although the counterbalance valve 104 is typically in closed, when the hydraulic line 94 is pressurized to the threshold used to rotate the outer wings 26 and 34, the counterbalance valve 104 is opened via a pilot connection to enable fluid to pass through the counterbalance valve 104 and flow back to the hydraulic supply through the outer wing folding port 106. Additionally, once the line has reached the threshold sufficient to unfold the wings, the pressure sustaining valve 108 opens allowing fluid to pass through, but the fluid flow is blocked by check valves 110, 112, and 114.

The hydraulic circuit 42 also may be used to fold the outer wings 26 and 34 when pressurized fluid is sent into the manifold 44 through the outer wing folding port 106. The fluid then bypasses the counterbalance valve 104 by passing through a check valve 116 and flows out of the manifold 44 and into the actuator cylinders 98 and 100 through the hydraulic port 102. As can be appreciated, by entering the actuator cylinders through the hydraulic port 102, the fluid urges the actuator cylinders 98 and 104 to retract thereby rotating respective outer wings 26 and 34 relative to respective inner wings 28 and 32 into respective folded positions. After the outer wings 26 and 34 have been folded onto respective inner wings 28 and 32, the fluid flows from the actuator cylinders 98 and 100 into the manifold 44 through the hydraulic port 96. The fluid then flows back into the hydraulic supply through the hydraulic line 94 out of the manifold 44 through the hydraulic port 92.

Additionally, the hydraulic circuit 42 may apply a downward force regardless of the positions of the wings. To lower the bar and/or enable downward forces 36, 38, and/or 40, pressurized fluid may be sent from a hydraulic supply through the lowering port 118. A first portion of the fluid passes through hydraulic port 86 to the lower the central tool bar 30 using the actuator cylinders 82 and 84 by urging the cylinders to retract. The fluid then returns to the hydraulic supply through the raising port 120. A second portion of the fluid then flows through the check valve 110. This second portion of fluid passes through the check valve 110 through pressure reducing valve 122. The pressure reducing valve 122 limits the pressure in the flow to a desired value for the actuated cylinders (e.g., 650 psi) by siphoning off and returning a portion of the fluid to the hydraulic supply. Accordingly, the pressure supplied as an outer wing downward force 36 to the outer wings 26 and 34 via respective actuator cylinders 98 and 100 is limited by the pressure reducing valve.

As can be appreciated, the outer wing downward force 36 essentially includes pressure in the same direction as the pressure used to unfold the wings. However, due to the limitation of the pressure on the fluid passing through the pressure reducing valve 122, the pressurized fluid may be insufficient to supply the threshold (e.g., 2,200 psi) used to unfold the outer wings 26 and 34. In other words, due to the inclusion of the pressure reducing valve 122, sending fluid through the lower port 118 may apply the outer wing downward force 36 when the outer wings 26 and 34 are deployed in the unfolded position, but the pressure supplied is unable to rotate the outer wings 26 and 34 to unfolded positions from respective folded positions. Accordingly, the inner wing downward forces 38 and central tool bar downward force 40 may be applied without unfolding the outer wings 26 and 34 when fluid is sent through the lowering port while the outer wings 26 and 34 are folded as illustrated in FIG. 2.

Similar to the second portion, a third portion of the fluid flowing through the lowering port 118 is passed through the check valve 112 into a pressure relieving valve 124. The pressure reducing valve 124 limits the pressure of the third portion of the fluid flowing through the pressure relieving valve 124 to a desired pressure suitable for providing the inner wing downward force 38 through the actuator cylinders 52 and 54 without unfolding the inner wings 28 and 32. For example, in some embodiments, this pressure (e.g., 650 psi) may be selected to be a value equal to the selected pressure used to provide the outer wing downward force 36 through the pressure reducing valve 122 and/or less than the threshold pressure (e.g., 2,200 psi) used to rotate the inner wings 28 and 32 into respective unfolded positions. Accordingly, the central tool bar downward force 40 may be applied when both the inner wings 28 and 32 and the outer wings 26 and 34 are in the folded position as illustrated in FIG. 3.

Additionally, in some embodiments of the agricultural implement 10, it may desirable to raise the central tool bar 30 and/or the wings during operation. For example, the hydraulic circuit 42 may be used to raise the central tool bar 30 and/or the wings, such as at an end of a row of crop to provide the ground engaging tools 22 clearance over the crop. For example, the central tool bar 30 may be raised, and the right outer wing tool bar 26, the right inner wing tool bar 28, the left inner wing tool bar 32, and the left outer wing tool bar 34 may be slightly folded so that the tool bars are lifted above the crop. In some embodiments, when the central tool bar 30 is raised the downward forces 36, 38, and 40 are disabled to enable fluid to flow in through the raising port 120 and back to the hydraulic supply through the lowering port 118. To raise the central tool bars and slightly lift the wing tool bars, fluid is provided to the raising port 120. Fluid entering the raising port 120 is directed toward the counterbalance valve 76. The fluid bypasses the counterbalance valve 76 by flowing through the check valve 78. The fluid then flows out the port 80 and to the actuators 82 and 84. The fluid directs the rods of the actuators 82 and 84 to extend and raise the central tool bar 30. When the actuators 82 and 84 are fully extended, fluid may exit the actuators 82 and 84 and flow back into the hydraulic supply through the lowering port 118.

Fluid entering the raising port 120 is also directed toward the solenoid valve 74. As illustrated, the solenoid valve 74 initially allows fluid to flow through, and flow is blocked from flowing to hydraulic line 48 by relief valve 126. Thus, the fluid flows toward hydraulic line 72, but the fluid is blocked from flowing through the pressure sequencing valve 68 due to insufficient pressure in the hydraulic line 72. Fluid also flows through the check valve 114 and a flow control valve 128. The fluid then flows through the pressure sustaining valve 108 and the check valve 116 to urge the actuators 98 and 100 to retract. Therefore, the outer wings 26 and 34 may begin rotating from the unfolded position to the folded position.

When pressure in the hydraulic line 72 is sufficient, the pressure sequencing valve 68 enables fluid to flow toward the actuators 52 and 54 to rotate the inner wings 28 and 32. Accordingly, the wings may rotate from the unfolded position toward the folded position. Moreover, a sensor (not shown) may be used to detect an angle between the central tool bar 30 and the right outer wing 26 and/or the left outer wing 34. When the sensor detects that the angle has reached a predetermined limit, the sensor is configured to energize the solenoid of the solenoid valve 74. For example, the sensor may include a micro switch that when actuated (e.g., closed) enables current to energize the solenoid of the solenoid valve 74. Conversely, when the micro switch is not actuated (e.g., open) current flow is blocked from flowing, thus the solenoid of the solenoid valve 74 is de-energized. When the solenoid of solenoid valve 74 is energized, the solenoid valve 74 blocks fluid flow from the raising port 120 to the hydraulic line 72. Thus, the wings stop rotating from the unfolded position toward the folded position.

The sensor may be configured so the wing tool bars are lifted to a sufficient height to clear crop so that the ground engaging tools 22 do not contact crop, such as for turning the agricultural implement 10 at the end of a row of crop. Moreover, as may be appreciated, the ends of the wing tool bars may be raised more than the central tool bar 30 because the ends of the wing tool bars may be inclined downward due to gravitational pull. Accordingly, by providing fluid to the raising port 120, the central tool bar 30 is raised and the wing tool bars are lifted. Moreover, the sensor may be directly coupled to the solenoid of the solenoid valve 74 to stop lifting the wing tool bars when the predetermined angle is reached. As such, the operator of the agricultural implement 10 does not have to check the height of the tool bar assembly 24 after fertilizing each row of crop because the central tool bar 30 and/or the wings are raised and lifted to a predetermined height by providing fluid to the bar raising port 120.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement comprising:
a main tool bar supporting main agricultural tools;
an inner wing tool bar pivotally coupled to the main tool bar and supporting inner wing agricultural tools;
an outer wing tool bar pivotally coupled to the inner wing tool bar and supporting outer wing agricultural tools; and
a folding system configured to rotate the outer wing tool bar relative to the inner wing tool bar to enable the agricultural implement to be operated in two or more narrower configurations, wherein each narrower configuration comprises a folded configuration with the outer wing tool bar folded inwardly to an up position, and wherein the folding system is configured to apply a first downward force, via a first subset of a plurality of actuated cylinders, on the main tool bar at least while the agricultural implement is in the narrower configurations and a second downward force, via a second subset of the plurality of actuated cylinders, on the inner wing tool bar while maintaining the outer wing tool bar in the up position.

2. The agricultural implement of claim 1, wherein the folding system is configured to apply a third downward force on the outer wing tool bar when the outer wing tool bar is in a down position via a third subset of the plurality of actuated cylinders.

3. The agricultural implement of claim 2, wherein the first downward force is greater than the second downward force and the third downward force.

4. The agricultural implement of claim 2, wherein the first downward force urges the inner wing and main agricultural tools into soil in a field on which the agricultural implement is being operated, and the second downward force urges the outer wing agricultural tools into the soil of the field.

5. The agricultural implement of claim 4, wherein the inner wing, outer wing, and main agricultural tools each comprise coulter discs.

6. The agricultural implement of claim 5, wherein the first downward forces urge the coulter discs of the inner wing and main tool bars into the soil at a substantially uniform depth regardless of outer wing tool bar position, and the second downward force urges the coulter discs of the outer wing tool bar into the soil at the substantially uniform depth when the outer wing tool bar is in the down position.

7. An agricultural implement comprising:
a main tool bar supporting main agricultural tools;
an inner wing tool bar supporting inner wing agricultural tools, the inner wing tool bar being pivotally coupled to the main tool bar;
an outer wing tool bar supporting outer wing agricultural tools, the outer wing tool bar being pivotally coupled to the inner wing tool bar; and
a folding system configured to rotate the outer wing tool bar to an up position relative to the inner wing tool bar and to apply a downward force on the main tool bar and the inner wing tool bar while maintaining the outer wing tool bar in the up position, wherein the folding system is configured to apply the downward force via one or more actuated cylinders, wherein at least one of the one or more actuated cylinders extends between the inner wing tool bar and the main tool bar, and the at least one of the one or more actuated cylinders is configured to apply at least a portion of the downward force on the inner wing tool bar.

8. The agricultural implement of claim 7, wherein the folding system is configured to rotate the inner wing tool bar relative to the main tool bar and to apply the downward force on the main tool bar after the inner wing tool bar is rotated.

9. The agricultural implement of claim 7, wherein the folding system is configured to toggle the outer wing tool bar between the up position and a down position.

10. The agricultural implement of claim 9, comprising a second inner wing tool bar and a second outer wing tool bar, wherein the agricultural implement is configured to fertilize 24 rows of vegetation when the outer wing tool bar and the second outer wing tool bar are in the down position.

11. The agricultural implement of claim 10, wherein the agricultural implement is configured to fertilize 16 rows of vegetation at least while the outer wing tool bar and the second outer wing tool bar are in the up position.

12. The agricultural implement of claim 7, wherein the folding system comprises a height adjustment system configured to raise and lower the main tool bar.

13. The agricultural implement of claim 12, wherein at least one of the one or more actuated cylinders is configured to vertically rotate the outer wing tool bar.

14. The agricultural implement of claim 12, wherein the height adjustment system is configured to use at least one of the one or more actuated cylinders to raise and lower the main tool bar.

15. The agricultural implement of claim 13, wherein the height adjustment system provides the downward force on the main tool bar when the main tool bar is in a lowered position.

16. The agricultural implement of claim 12, wherein the folding system comprises a manifold configured to receive control inputs from a work vehicle towing the agricultural implement.

17. A method of operating an agricultural implement:
raising outer wing tool bars of the agricultural implement to enable the agricultural implement to operate in a narrower configuration;
lowering inner wing tool bars and a main tool bar; and
applying a downward force, via one or more actuated cylinders, on the inner wing tool bars and the main tool bar to urge agricultural tools to engage soil while the outer wing tool bars are raised, wherein at least one of the one or more actuated cylinders extends between a respective inner wing tool bar and the main tool bar, and the at least one of the one or more actuated cylinders is configured to apply at least a portion of the downward force on the inner wing tool bar.

18. The method of claim 17, wherein raising the outer wing is performed before the inner wing tool bars and the main tool bar are lowered and the downward force is applied.

* * * * *